(12) United States Patent
Wang et al.

(10) Patent No.: US 9,660,678 B2
(45) Date of Patent: May 23, 2017

(54) ADAPTIVE RADIO FREQUENCY LOCAL OSCILLATOR TUNING

(71) Applicant: QUALCOMM Incorporated, San Diego, CA (US)

(72) Inventors: Jibing Wang, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 14/486,113

(22) Filed: Sep. 15, 2014

(65) Prior Publication Data

US 2016/0080017 A1    Mar. 17, 2016

(51) Int. Cl.
| | | |
|---|---|---|
| H03D 3/00 | (2006.01) | |
| H04L 27/14 | (2006.01) | |
| H04B 1/10 | (2006.01) | |
| H04W 84/12 | (2009.01) | |
| H04B 1/00 | (2006.01) | |

(52) U.S. Cl.
CPC ......... *H04B 1/1036* (2013.01); *H04B 1/1027* (2013.01); *H04B 1/005* (2013.01); *H04B 2001/1045* (2013.01); *H04B 2001/1072* (2013.01); *H04W 84/12* (2013.01)

(58) Field of Classification Search
CPC .................................................... H04B 1/1036
USPC ...................... 455/522, 296, 234.1, 255, 3.01
See application file for complete search history.

(56) References Cited

U.S. PATENT DOCUMENTS

| | | | |
|---|---|---|---|
| 6,694,131 B1 * | 2/2004 | Lakkis | H03D 7/165 455/192.1 |
| 8,198,944 B2 | 6/2012 | Sun et al. | |
| 2003/0186666 A1 * | 10/2003 | Sindhushayana | H04L 7/0054 455/260 |
| 2006/0045126 A1 | 3/2006 | Klahn et al. | |
| 2007/0207736 A1 | 9/2007 | Ragan et al. | |
| 2008/0039042 A1 * | 2/2008 | Ciccarelli | H04B 1/109 455/234.1 |

(Continued)

FOREIGN PATENT DOCUMENTS

WO    WO-2008072171 A1    6/2008

OTHER PUBLICATIONS

Zou et al., "A Fully Symmetrical 60Hz Transceiver Architecture for IEEE 802.15.3c Application", School of Electrical and Electronic Engineering, Nanyang Technological University, Singapore 639798, Singapore; Apr. 10, 2010, 3 pages.

(Continued)

*Primary Examiner* — Wednel Cadeau
(74) *Attorney, Agent, or Firm* — Holland & Hart LLP

(57) ABSTRACT

Methods, systems, and devices are described for adaptively or dynamically tuning a radio frequency (RF) local oscillator (LO) for wireless communications. In one example, a radio may receive an RF signal and the LO of a radio may be tuned to a frequency that is an offset from its reception (RX) center frequency to deal with interference from another signal, such as one being transmitted using a different radio access technology (RAT) than that of the radio. The offset may be determined based upon an effect of the tuning on an attribute of the RF signal. In addition, the offset may be determined based on interference caused by the other signal.

19 Claims, 10 Drawing Sheets

(56) References Cited

U.S. PATENT DOCUMENTS

| | | | |
|---|---|---|---|
| 2009/0305643 A1* | 12/2009 | Sayers | H04B 1/1027 |
| | | | 455/68 |
| 2010/0316098 A1* | 12/2010 | Pals | H04B 1/28 |
| | | | 375/219 |
| 2011/0171919 A1 | 7/2011 | Tryhub et al. | |
| 2012/0213116 A1* | 8/2012 | Koo | H04B 1/1027 |
| | | | 370/253 |
| 2013/0260806 A1 | 10/2013 | Allpress | |

OTHER PUBLICATIONS

ISA/EPO, International Search Report and Written Opinion of the International Searching Authority, Int'l. App. No. PCT/US2015/045192, Nov. 16, 2015, European Patent Office, Rijswijk, NL, 11 pgs.

* cited by examiner

ADAPTIVE RADIO FREQUENCY LOCAL OSCILLATOR TUNING

FIELD OF THE DISCLOSURE

The following relates generally to wireless communication, and more specifically to tuning a radio frequency (RF) local oscillator (LO) for wireless communications.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

When a wireless communications device receives a radio frequency (RF) signal according to a particular radio access technology (RAT), a corresponding radio of the device may employ a local oscillator (LO) to downconvert the frequency of the received RF signal to an intermediate frequency and/or to a baseband frequency. The device also may receive other signals at different frequencies according to different RATs. In some cases, one of the other signals may, when downconverted by the LO, interfere with the RF signal.

SUMMARY

The described features generally relate to improved systems, methods, and/or apparatuses for wireless communications. More particularly, the described features relate to techniques for adaptively or dynamically tuning a radio frequency (RF) local oscillator (LO) for wireless communications. In one example, a radio may receive an RF signal and the LO of a radio may be tuned to a frequency that is an offset from its reception (RX) center frequency to mitigate interference from another signal. In one example, the other signal may be transmitted using a different radio access technology (RAT) than that of the radio. The offset may be determined based upon an effect of the tuning on an attribute of the RF signal. In addition, the offset may be determined based on interference caused by the other signal.

A method for wireless communications is described. According to one configuration, the method may involve receiving, at a first radio operating at a first frequency, a first signal. A local oscillator (LO) of the first radio may be tuned to a second frequency. An effect on an attribute of the first signal caused by the tuning may be identified. Based at least in part on the identified effect, an offset for the second frequency may be selected.

In some examples, the method may involve receiving, at the first radio, a second signal from a second radio operating at a third frequency. In such examples, the method may involve selecting the offset based at least in part on interference caused by the second signal. Alternatively or additionally, the offset may be selected based at least in part on a strength of the second signal. Alternatively or additionally, the offset may be selected based at least in part on a transmission power of the second signal.

In some examples, the method may involve down converting the first signal and the second signal to baseband. In such examples, the offset may be selected such that there is no overlap between a base bandwidth of the first signal and a base bandwidth of the second signal. Alternatively, the offset may be selected such that there is a partial overlap between a base bandwidth of the first signal and a base bandwidth of the second signal.

In some examples, the first radio and the second radio are included in a single wireless communication device. In such examples, the method may involve performing a handover of the second signal to a fourth frequency. Further, the offset may be selected based at least in part on the fourth frequency. In some example, the offset may be selected to be zero.

In some examples, the attribute of the first signal may be a signal-to-interference-plus-noise ratio of the first signal. Alternatively or additionally, the attribute of the first signal may be a signal-to-noise ratio of the first signal. Alternatively or additionally, the attribute of the first signal may be a strength of the first signal. Alternatively or additionally, the attribute of the first signal may be a received signal strength indicator (RSSI) of the first signal.

In some examples, the first signal may be transmitted according to a first radio access technology (RAT), and the second signal may be transmitted according to a second RAT. In such examples, the first RAT may be wireless local area network (WLAN) based, and the second RAT may be cellular wide area network (WAN) based.

An apparatus for wireless communications is described. According to one configuration, the apparatus may include: a first radio operating at a first frequency; a receiver of the first radio to receive a first signal; a local oscillator (LO) of the first radio; and, an oscillator controller to tune the LO to a second frequency based at least in part on an effect on an attribute of the first signal caused by the tuning. The apparatus may include these and/or other elements configured to carry out various operations of the methods described above and herein.

Another apparatus for wireless communications is described. According to one configuration, the apparatus may include: means for receiving, at a first radio operating at a first frequency, a first signal; means for tuning a local oscillator (LO) of the first radio to a second frequency; means for identifying an effect on an attribute of the first signal caused by the tuning; and, means for selecting an offset for the second frequency, the offset based at least in part on the identified effect. The apparatus may include these and/or other elements configured to carry out various operations of the methods described above and herein.

A non-transitory computer-readable medium is described. The medium may store computer-executable code for wireless communications. The code may be executable by a processor to: receive, at a first radio operating at a first frequency, a first signal; tune a local oscillator (LO) of the first radio to a second frequency; identify an effect on an attribute of the first signal caused by the tuning; and, select an offset for the second frequency, the offset based at least in part on the identified effect. The code may be executable by the processor to perform these and/or other various operations of the methods described above and herein.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
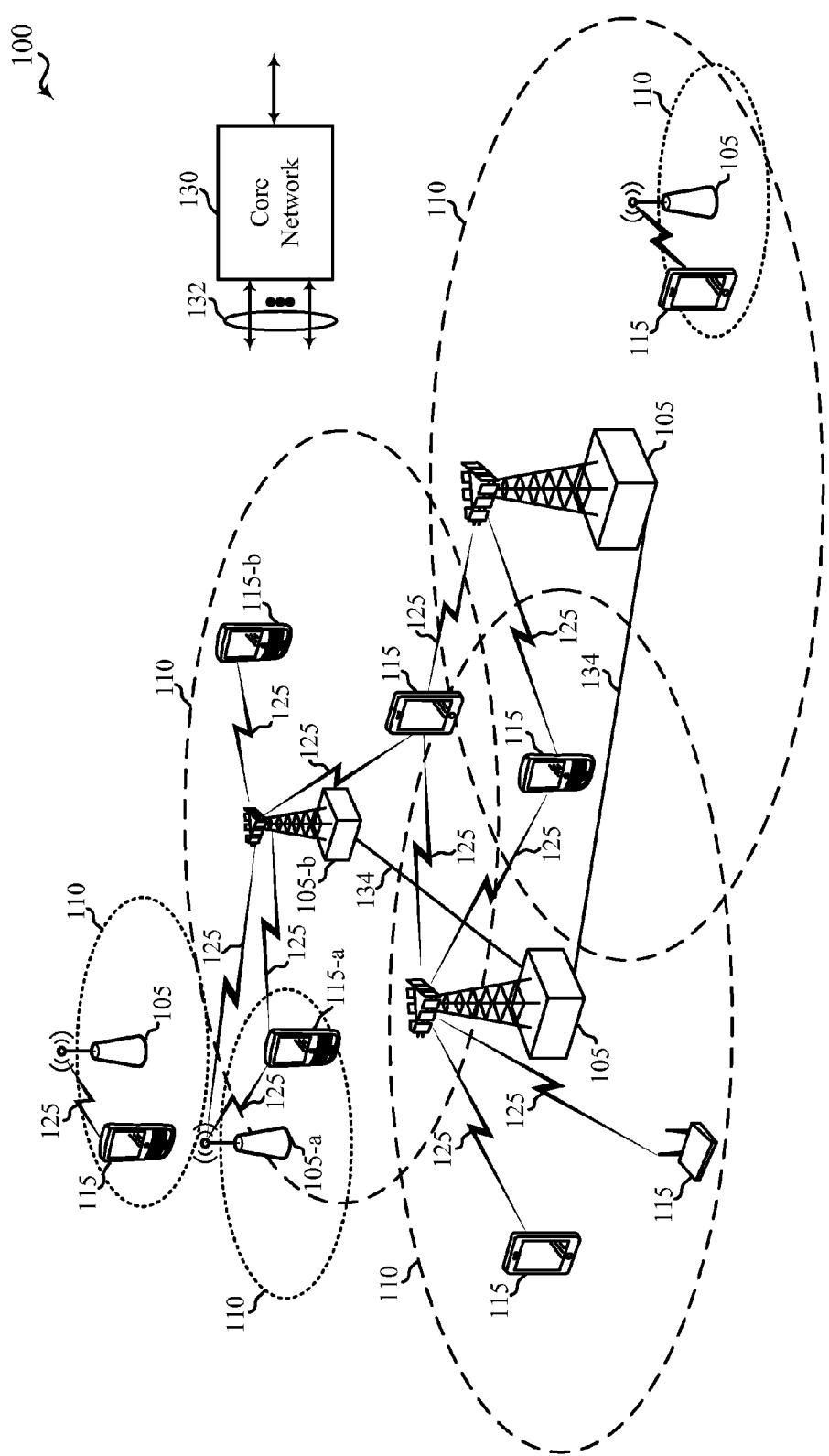
FIG. 1 shows a block diagram of a wireless communication system, in accordance with various aspects of the present disclosure.

Tuning of a local oscillator (LO) of a radio may be employed, for example, to mitigate interference from other signals, such as signals operating in disparate radio access technologies (RATs). For example, the radio of a device may receive signals according to a first RAT, such as a wireless local area network (WLAN). When receiving a WLAN signal, the radio may also receive signals according to another RAT, such as a long term evolution (LTE) signal. The LO may be tuned to avoid interference from the LTE signal by selecting an offset from a RX center frequency of the LO. While such an approach may mitigate interference, the tuning of the LO may result in an undesirable effect on the received WLAN signal. Thus, the tuning of the LO may be adaptive or dynamic to take into account an effect the tuning has on an attribute of the RF signal (e.g., the WLAN signal), such as signal-to-interference-plus-noise ratio (SINR), signal-to-noise ratio (SNR) of the first signal, strength, and/or received signal strength indicator (RSSI).

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram of a wireless communication system 100 in accordance with various aspects of the present disclosure is shown. The wireless communication system 100 may include a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or certain access points 105 (e.g., base stations or eNBs) in various implementations. Some of the access points 105 may communicate control information and/or user data with the core network 130 through a backhaul 132. In some implementations, some of the access points 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, scheduling information, data, etc.

The access points 105 may wirelessly communicate with the UEs 115 via access point antennas. Each of the access points 105 may provide communication coverage for a respective coverage area 110. In some implementations, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for an access point 105 may be divided into sectors (not shown) making up only a portion of the respective coverage area 110. The wireless communication system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas 110 of different access points 105, including the coverage areas of the same or different types of access points 105, utilizing the same or different radio technologies, and/or belonging to the same or different access networks, may overlap. The coverage areas 110 may be considered to define cells, such as macro cells M and small cells S (e.g., femto cells, pico cells, etc.) as illustrated in FIG. 1. Although the small cells S are shown with only a single UE 115 within the respective coverage areas for simplicity, it should be understood that any number of UEs 115 may be within the coverage area of a small cell S.

In some implementations, the wireless communication system 100 may include an LTE/LTE-A communications system (or network), which LTE/LTE-A communications system may support modes of operation or deployment scenarios for communicating using an unlicensed radio frequency spectrum band. In other implementations, the wireless communication system 100 may support wireless communication using a licensed radio frequency spectrum band and an access technology different from LTE/LTE-A. In LTE/LTE-A communications systems, the term evolved NodeB or eNB may be generally used to describe the access points 105. The wireless communication system 100 may be a heterogeneous LTE/LTE-A/network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via the backhaul 132 (e.g., S1 application protocol, etc.). The eNBs 105 may also communicate with one another, directly or indirectly, via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communication system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions.

Because the UEs 115 may communicate via various radio technologies, such non-coordinated signals carried over the communications links 125 may cause undesirable interference. For example, a first UE 115-*a* may receive a WLAN communication from a first base station (e.g., access point) 105-*a* and concurrently receive an LTE communication from a second base station 105-*b*. The first UE 115-*a* may include first and second radios for WLAN and LTE, respectively.

However, the signal of the LTE communication may be received by the first radio as well, which may lead to interference with the signal of the WLAN communication. Similarly, communications (e.g., LTE) by a second UE 115-*b* (e.g., nearby the first UE 115-*a*) may be received by the first radio of the first UE 115-*a*, and may cause interference with the WLAN communication.

As described herein, a local oscillator (LO) of the first radio of the first UE 115-*a* may be tuned to mitigate interference with the WLAN communication in either case. Thus, tuning of the LO may be employed for multi-radio coexistence, particularly when multiple radios are on the same UE (e.g., UE 115-*a*). However, such tuning may affect the WLAN signal in addition to reducing interference. Thus, the tuning may take into account an effect on the WLAN signal in addition to mitigating interference.

Figure 2A:
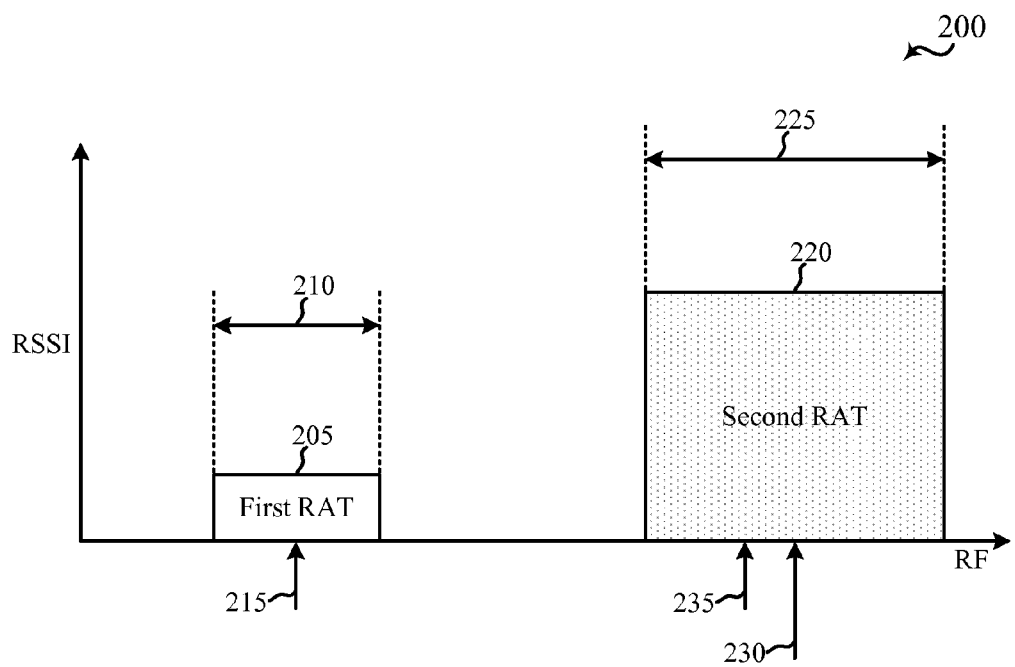
FIG. 2A shows a diagram that illustrates an example of two RF signals according to different RATs that may be received by a radio of a wireless communication device, in accordance with various aspects of the present disclosure.

FIG. 2A shows a diagram that illustrates an example 200 of two RF signals according to different RATs that may be received by a radio of a wireless communication device, in accordance with various aspects of the present disclosure. These RF signals may be examples of signals received by one of the UEs 115 via communications links 125 described with respect to FIG. 1. In the example 200, a first signal 205 of a first RAT (e.g., WLAN) may have a bandwidth 210 with a center frequency 215. The LO of the radio (not shown) may have a corresponding RX center frequency (equal to the center frequency 215 or at least within the bandwidth 210). A second signal 220 of a second RAT (e.g., LTE) may have a bandwidth 225 with a center frequency 230. A second harmonic frequency 235 of the RX center frequency of the LO (equal to the center frequency 215 of the first signal 205 in this example) falls within the bandwidth 225 of the second signal 220.

Figure 2B:
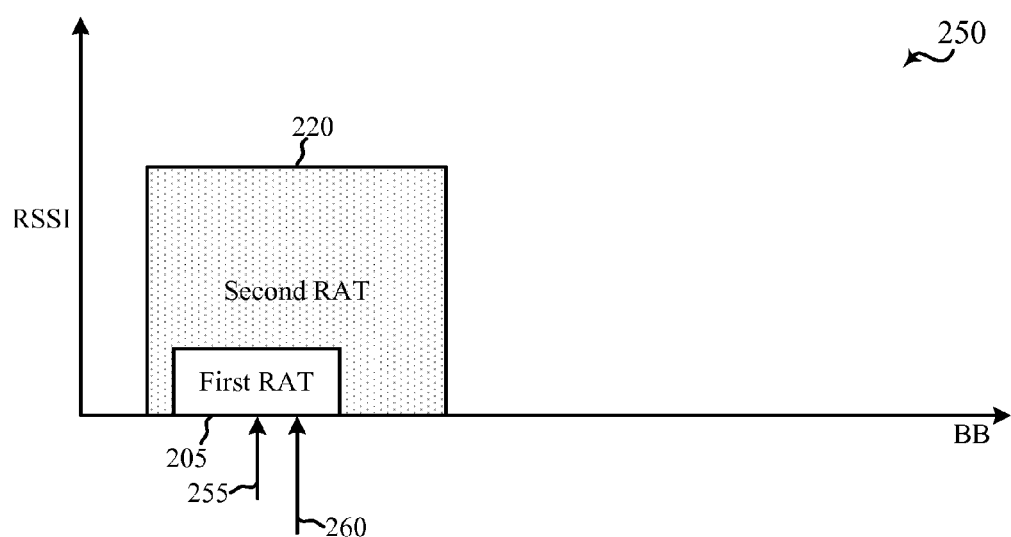
FIG. 2B shows a diagram that illustrates an example of the two RF signals of FIG. 2A downconverted by the radio of the wireless communication device, in accordance with various aspects of the present disclosure.

FIG. 2B illustrates an example 250 of the first and second signals 205, 220 of FIG. 2A upon being downconverted by the LO of the radio (not shown) of the wireless communication device, in accordance with various aspects of the present disclosure. Downconversion by the LO may be to an intermediate frequency or to baseband (BB), as shown. The first signal 205 at baseband has a center frequency 255 (e.g., DC, the sub-carrier corresponding to zero frequency in the baseband signal) and the second signal 220 at baseband has a center frequency 260. As shown, the second signal 220 at baseband ends up on top of the first signal 205 at baseband. Thus, the second signal 220 may cause significant interference with the first signal 205 (e.g., possibly causing desensing of the first signal 205).

Figure 3A:
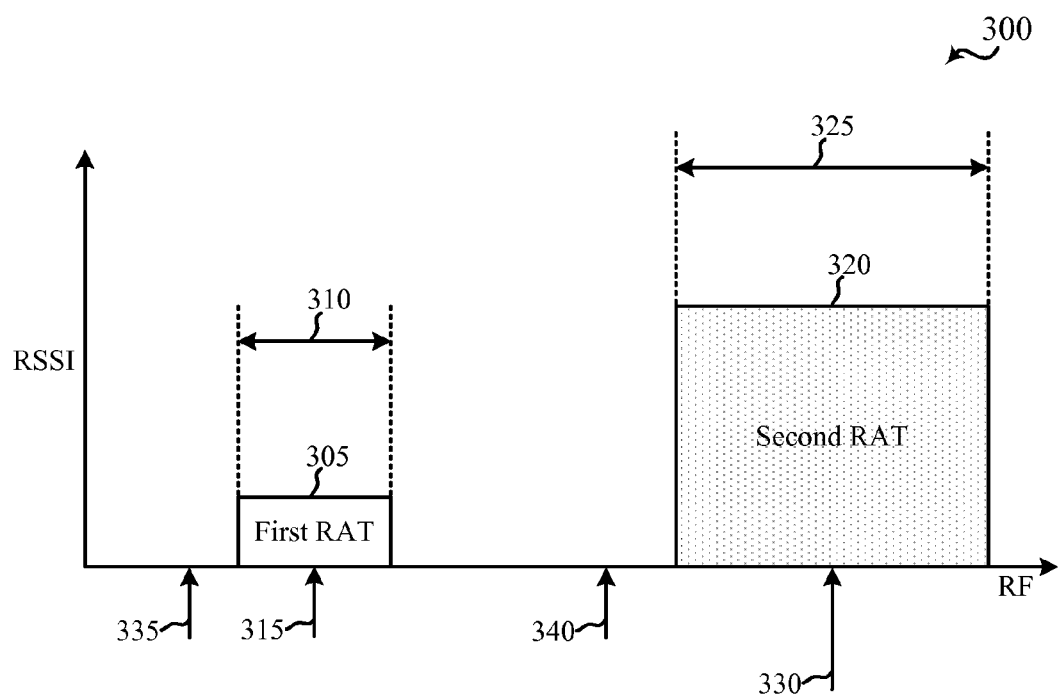
FIG. 3A shows a diagram that illustrates an example of two RF signals according to different RATs that may be received by a radio of a wireless communication device that employs tuning of an LO of the radio, in accordance with various aspects of the present disclosure.

FIG. 3A shows a diagram that illustrates an example 300 of two RF signals according to different RATs that may be received by a radio of a wireless communication device that employs tuning of an LO of the radio, in accordance with various aspects of the present disclosure. Again, these RF signals may be examples of signals received by one of the UEs 115 via communications links 125 described with respect to FIG. 1. In the example 300, a first signal 305 of a first RAT (e.g., WLAN) may have a bandwidth 310 with a center frequency 315. The LO of the radio (not shown) may have a corresponding RX center frequency (equal to the center frequency 315 or at least within the bandwidth 310). A second signal 320 of a second RAT (e.g., LTE) may have a bandwidth 325 with a center frequency 330.

A harmonic frequency (not shown) of the RX center frequency of the LO (e.g., equal to the center frequency 315 of the first signal 305) may fall within the bandwidth 325 of the second signal 320. In one example, the LO of the radio may be tuned to avoid interference from the second signal 320. For example, the LO may be tuned to an offset frequency 335 (offset with respect to the RX center frequency) such that a harmonic frequency 340 of the offset frequency 335 does not fall within the bandwidth 325 of the second signal 320.

Figure 3B:
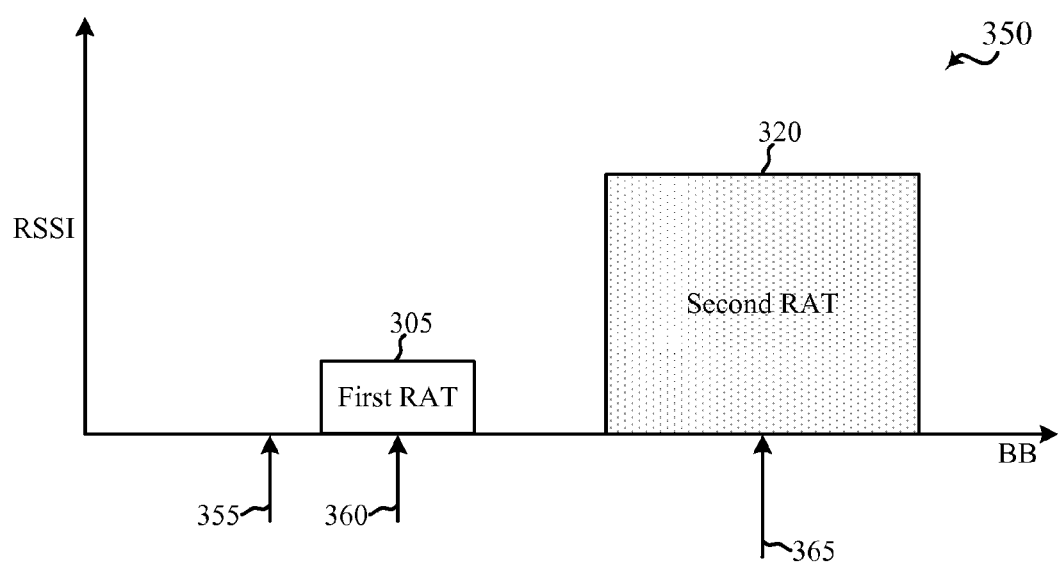
FIG. 3B shows a diagram that illustrates an example of the two RF signals of FIG. 3A downconverted by the radio of the wireless communication device with the LO tuned, in accordance with various aspects of the present disclosure.

FIG. 3B illustrates an example 350 of the first and second signals 305, 320 of FIG. 3A upon being downconverted by the LO of the radio (not shown) of the wireless communication device, in accordance with various aspects of the present disclosure. Downconversion by the LO may be to an intermediate frequency or to baseband (BB), as shown. With the LO tuned to the offset frequency 335 (FIG. 3A), the first signal 305 at baseband has a center frequency 360 and the second signal 320 at baseband has a center frequency 365. As shown, the second signal 320 at baseband has no overlap with the first signal 305 at baseband. Thus, the second signal 320 may not cause noticeable interference with the first signal 305 when the LO has been tuned in this manner. As appropriate or desired, the frequency of the first signal 305 at baseband may be further moved to DC 355 by baseband processing, such as with a frequency rotator (which may already be present to handle station/access point drift).

As discussed herein, mitigating potential interference by tuning the LO (e.g., comparing FIG. 2B without tuning and FIG. 3B with tuning) is a possible approach for multi-radio coexistence. However, the effect of LO tuning on the desired signal (e.g., the WLAN signal 305 in examples 300 and 350 of FIGS. 3A and 3B) may be undesirable. For example, tuning the LO to a frequency that is an arbitrarily large offset from the RX center frequency of the LO may decrease the SINR of the desired signal (e.g., due to baseband filtering). Thus, taking into account the impact of the LO tuning on the desired signal may allow for a balancing between interference mitigation and signal quality.

According to various aspects described herein, an effect (e.g., lowering or raising) on an attribute of the desired signal caused by the tuning of the LO may be identified. Various attributes of a signal may be ascertained readily, such as a strength of the signal, a received signal strength indicator (RSSI) of the signal, a signal-to-noise ratio (SNR) of the signal and/or a signal-to-interference-plus-noise (SINR) ratio of the signal. It should be understood that any suitable attribute may be used, for example, that reflects a quality of the desired signal.

The identified effect (e.g., a value or magnitude) on the desired signal may be used to select an offset for tuning the LO to the offset frequency. Thus, the quality of the desired signal may be maintained to a certain degree while still reducing interference by LO tuning. In general, whatever the reason for tuning the LO (e.g., interference mitigation), the quality of the desired signal may be taken into account so that negative impact on the desired signal may be controlled. The offset may be dynamically selected, for example, with less of an offset when the impact of tuning the LO on the desired signal is greater and more of an offset when the impact of tuning the LO on the desired signal is less.

Selecting the offset for tuning the LO to the offset frequency may also be based on an attribute (or an effect thereon) of a second signal received by the radio. In the case of interference mitigation, potential interference caused by the second signal may be considered for selecting the offset. Alternatively or additionally, a strength of the second signal and/or a transmission (TX) power of the second signal may be considered for selecting the offset.

In some implementations, the offset may be selected such that there is no overlap between a bandwidth of the desired signal and a bandwidth of the second (potentially interfering) signal after downconversion by the LO. For example, the offset may be selected such that there is no overlap between a base bandwidth of the desired signal and a base bandwidth of the second signal.

In other implementations, the offset may be selected such that there is a partial overlap between the bandwidth of the desired signal and the bandwidth of the second signal after downconversion by the LO. For example, the offset may be selected such that there is a partial overlap between the base bandwidth of the desired signal and the base bandwidth of the second signal.

In still other implementations, the offset may be selected to be zero, for example, when the strength or TX power of the second signal is sufficiently low (e.g., as compared to the RSSI of the desired signal). If the second signal is not strong enough to cause significant interference (e.g., desense of the desired signal), a zero offset may minimize the effect (e.g., no effect) of the tuning of the LO on the desired signal.

As described herein, the tuning of the LO may be adaptive or dynamic by setting the offset based on various factors. Further, the tuning of the LO may be adaptive/dynamic by changing the setting of the offset based on changing conditions, such as varying signal strengths.

In some implementations, the wireless communications device may include a second radio that operates according to another RAT (e.g., LTE) and receives the second signal. In such cases, the second radio may perform a handoff procedure so that the second signal is received at a different frequency. For example, the different frequency may be relatively far from the harmonics of the RX center frequency of the LO. Thus, in some cases, the offset may be reset to zero when the handover procedure occurs.

Figure 4A:
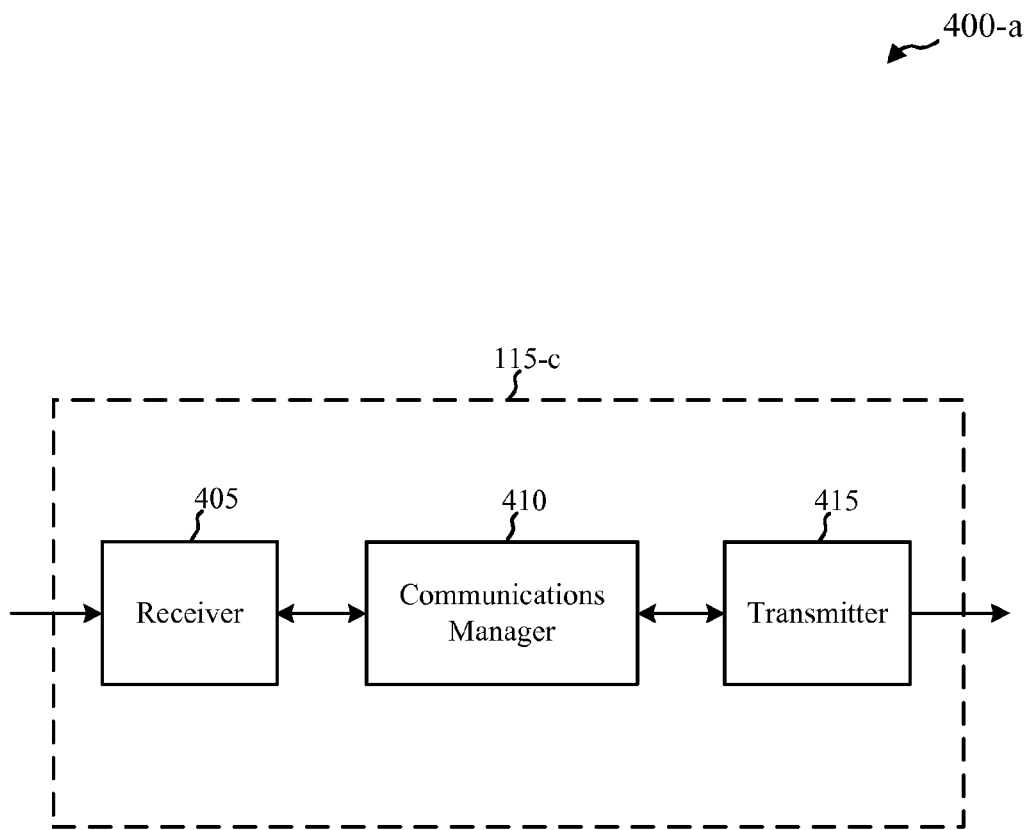
FIG. 4A shows a block diagram of an example of an apparatus that may be used for wireless communications, in accordance with various aspects of the present disclosure.

Turning now to FIG. 4A, a block diagram 400-*a* of an apparatus 115-*c* is shown that may be used for wireless communications, in accordance with various aspects of the present disclosure. In some implementations, the apparatus 115-*c* may be an example of various aspects of the UEs 115 described with reference to FIG. 1 and/or the wireless communication device described with reference to FIGS. 2A, 2B, 3A and/or 3B. The apparatus 115-*c* may also be a processor. The apparatus 115-*c* may include a receiver 405, a communications manager 410, and/or a transmitter 415. Each of these components may be in communication with each other.

The components of the apparatus 115-*c* (as well as those of other related apparatus described herein) may, individually or collectively, be implemented using application-specific integrated circuits (ASICs) adapted to perform some or all of the applicable functions in hardware. Alternatively, the functions may be performed by other processing units (or cores), on integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by general or application-specific processors.

In some implementations, the receiver 405 may be or include a radio frequency (RF) receiver, such as an RF receiver operable to receive transmissions according to a particular radio access technology (RAT). In some cases, as in the examples described herein, the RAT may be WLAN. The receiver 405 may be used to receive various types of data and/or control signals (e.g., transmissions) over communication link(s) (e.g., physical channels) of a wireless communication system, such as communication links of the wireless communication system 100 described with reference to FIG. 1.

In some implementations, the transmitter 415 may be or include an RF transmitter, such as an RF transmitter operable to transmit according to the particular RAT, e.g., WLAN. The transmitter 415 may be used to transmit various types of data and/or control signals (e.g., transmissions) over communication link(s) (e.g., physical channels) of a wireless communication system, such as communication links of the wireless communication system 100 described with reference to FIG. 1.

In some implementations, the communications manager 410 may be used to manage wireless communication according to the particular RAT, e.g., WLAN. For example, the communications manager 410 may be used to manage the transmitter 415 and/or the receiver 405. According to aspects of this disclosure, the communications manager 410 may be used to manage or otherwise control the receiver in such a way that a local oscillator (LO) of the receiver 405 is tuned.

As discussed herein, the receiver 405 may receive a first signal according to the RAT, e.g., WLAN. The first signal may have various ascertainable (measurable) attributes that may be affected by tuning of the LO of the receiver 405. The communications manager 410 may take into account an effect of tuning the LO on the attribute(s) when selecting or otherwise determining an offset for tuning the LO from its RX center frequency.

For example, when the receiver 405 receives another signal (e.g., LTE) at a different frequency that may interfere with the first signal (e.g., WLAN) after downconversion by the LO, the communications manager 410 may tune the LO of the receiver 405 in an attempt to mitigate potential interference from the second signal. However, because the communications manager 410 takes into account the effect(s) of tuning the LO on the attribute(s) of the first signal, a suitable balance may be struck between interference mitigation and quality of the first signal.

Figure 4B:
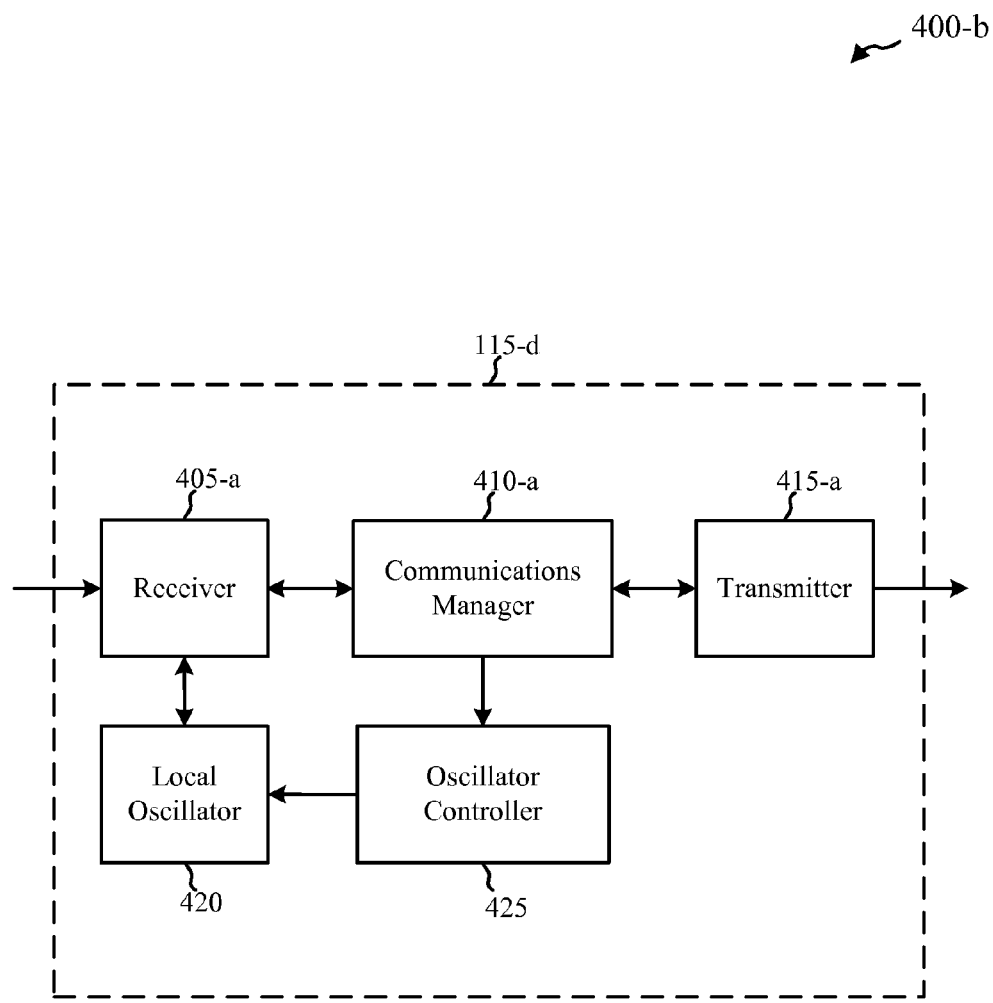
FIG. 4B shows a block diagram of another example of an apparatus that may be used for wireless communications, in accordance with various aspects of the present disclosure.

FIG. 4B shows a block diagram 400-*b* of an apparatus 115-*d* that may be used for wireless communications, in accordance with various aspects of the present disclosure. In some implementations, the apparatus 115-*d* may be an example of various aspects of the apparatus described above with reference to FIG. 4A and/or the UEs 115 described with reference to FIG. 1. The apparatus 115-*d* may also be a processor. The apparatus 115-*d* may include a receiver 405-*a*, a communications manager 410-*a*, a transmitter 415-*a*, a local oscillator (LO) 420 and/or an oscillator controller 425. Each of these components may be in communication with each other.

In some implementations, the receiver 405-*a* and the transmitter 415-*a* may operate similarly to the receiver 405 and the transmitter 415, respectively, as described above with reference to FIG. 4A. As discussed herein, the receiver 405-*a* may receive a first signal according to the RAT, e.g., WLAN. The first signal may have various ascertainable (measurable) attributes that may be affected by tuning of the LO 420.

In some implementations, the communications manager 410-*a* may perform similar operations as the communications manager 410 described above with reference to FIG. 4A. Further, the communications manager 410-*a* may cooperate with the oscillator controller 425 to tune the LO 420 as described herein. In some implementations, the LO 420 may be a sub-component or of the receiver 405-*a*. Further, in some implementations, the oscillator controller 425 may be a sub-component of the communications manager 410-a or of the receiver 405-a.

The communications manager 410-a may receive the first signal from the receiver 405-a, and may ascertain the effect(s) of tuning the LO 420 on the attribute(s) of the first signal. Based on the effect(s), the communications manager 410-a may select/determine an offset from the RX center frequency of the LO 420 for tuning the LO 420, and instruct the oscillator controller 425 to tune the LO 420 according to the selected/determined offset.

Alternatively, the oscillator controller 425 may receive the first signal, either directly from the receiver 405-a or via the communications manager 410-a (as shown), and ascertain the effect(s) of tuning the LO 420 on the attribute(s) of the first signal. Based on the effect(s), the oscillator controller 425 may select/determine the offset from the RX center frequency of the LO 420, and cause the LO 420 to be tuned according to the selected/determined offset.

Figure 4C:
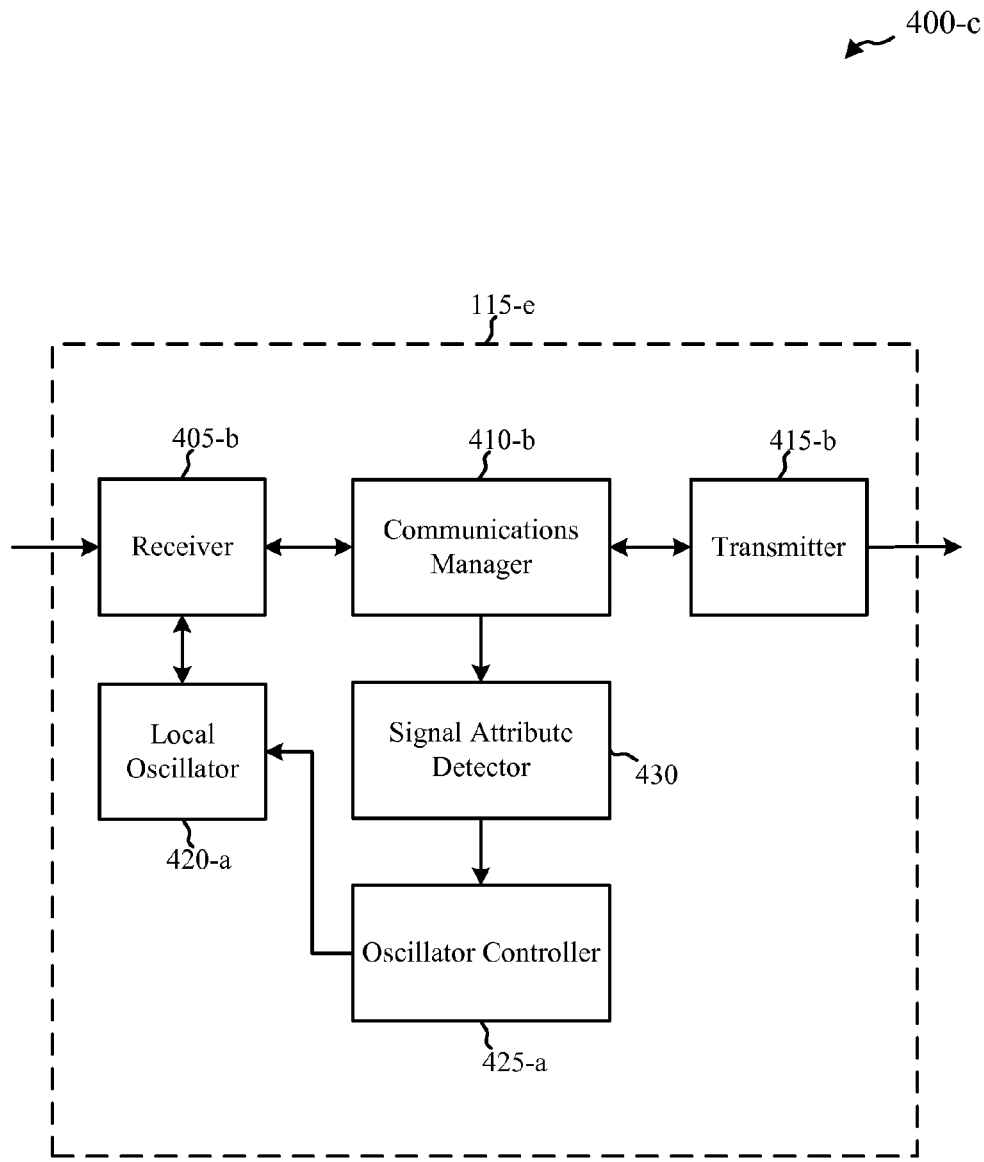
FIG. 4C shows a block diagram of yet another example of an apparatus that may be used for wireless communications, in accordance with various aspects of the present disclosure.

FIG. 4C shows a block diagram 400-c of an apparatus 115-e that may be used for wireless communications, in accordance with various aspects of the present disclosure. In some implementations, the apparatus 115-e may be an example of various aspects of the apparatus described above with reference to FIGS. 4A and/or 4B, and/or the UEs 115 described with reference to FIG. 1. The apparatus 115-e may also be a processor. The apparatus 115-e may include a receiver 405-b, a communications manager 410-b, a transmitter 415-b, a local oscillator (LO) 420-a, an oscillator controller 425-a and/or a signal attribute detector 430. Each of these components may be in communication with each other.

In some implementations, the receiver 405-b and the transmitter 415-b may operate similarly to the receiver 405 and the transmitter 415, respectively, as described above with reference to FIG. 4A. As discussed herein, the receiver 405-b may receive a first signal according to the RAT, e.g., WLAN. The first signal may have various ascertainable (measurable) attributes that may be affected by tuning of the LO 420-a.

In some implementations, the communications manager 410-b may perform similar operations as the communications manager 410, 410-a described above with reference to FIGS. 4A and/or 4B. Further, the communications manager 410-b may cooperate with the signal attribute detector 430 to determine an effect on the attribute(s) of the oscillator controller 425-a to tune the LO 420-a as described herein. The signal attribute detector 430 may receive the first signal directly from the receiver 405-b (or via the communications manager 410-b), and ascertain the effect(s) of tuning the LO 420-a on the attribute(s) of the first signal. Based on the effect(s), the oscillator controller 425-a (or the communications manager 410-b) may select/determine an offset from the RX center frequency of the LO 420-a for tuning the LO 420-a. The oscillator controller 425-a may cause the LO 420-a to be tuned according to the selected/determined offset.

The signal attribute detector 430, either alone or in combination with the communications manager 410-b and/or the oscillator controller 425-a, may detect, measure or otherwise determine various signal attributes, such as discussed herein, as well as the effect(s) of LO tuning thereon. The signal attribute detector 430 may determine signal attributes (and/or the effect(s) of LO tuning thereon) of other signals, in addition to the first (desired) signal. Thus, the signal attribute detector 430 may also assess an interfering signal for LO tuning (e.g., offset selection/determination), such as described herein.

Figure 4D:
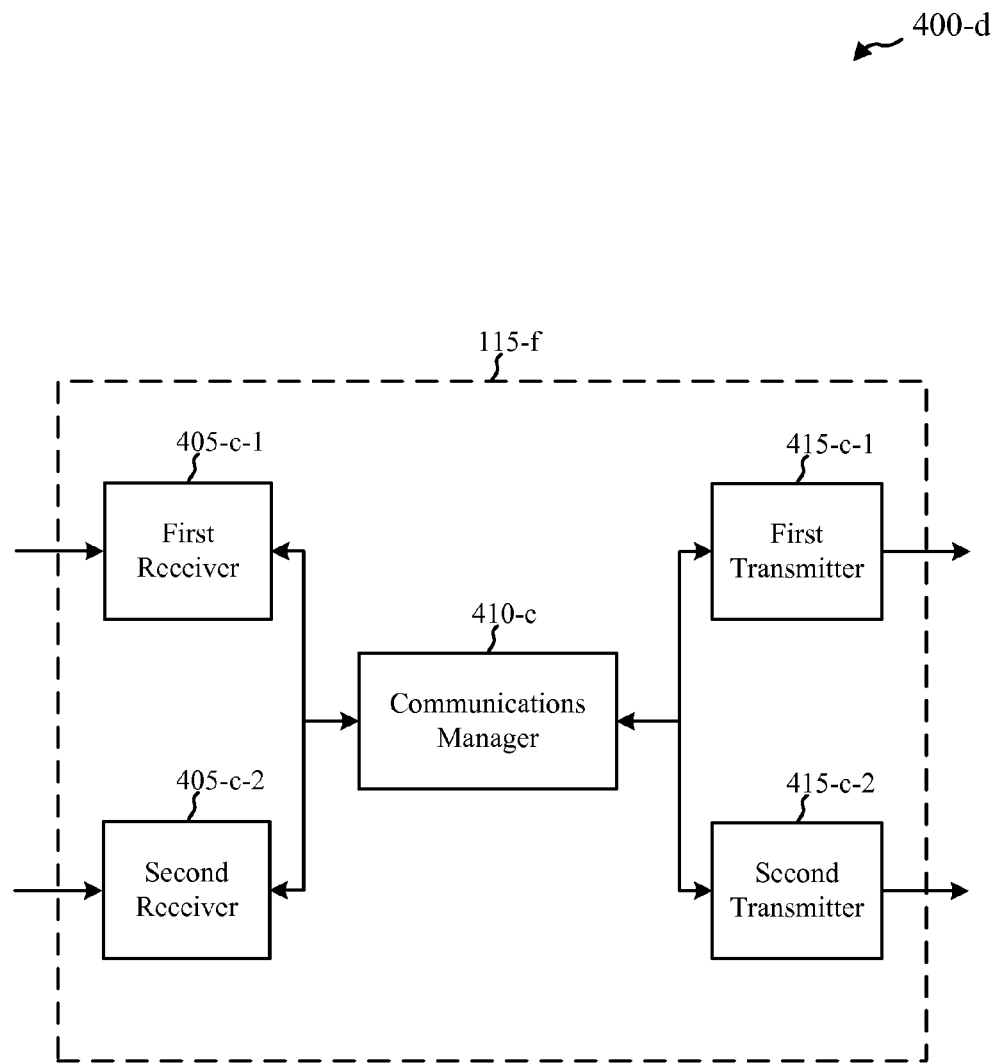
FIG. 4D shows a block diagram of still another example of an apparatus that may be used for wireless communications, in accordance with various aspects of the present disclosure.

FIG. 4D shows a block diagram 400-d of an apparatus 115-f that may be used for wireless communications, in accordance with various aspects of the present disclosure. In some implementations, the apparatus 115-f may be an example of various aspects of the apparatus described above with reference to FIGS. 4A, 4B and/or 4C, and/or the UEs 115 described with reference to FIG. 1. The apparatus 115-f may also be a processor. The apparatus 115-f may include a first receiver 405-c-1, a communications manager 410-c, a first transmitter 415-c-1, a second receiver 405-c-2 and/or a second transmitter 415-c-2. Each of these components may be in communication with each other.

In some implementations, the first receiver 405-c-1 and the first transmitter 415-c-1 may operate similarly to the receiver 405 and the transmitter 415, respectively, as described above with reference to FIG. 4A. The first receiver 405-c-1 and the first transmitter 415-c-1 may operate according to a first RAT, e.g., WLAN. The second receiver 405-c-2 and the second transmitter 415-c-2 also may perform similarly to the receiver 405 and the transmitter 415, respectively, as described above with reference to FIG. 4A. The second receiver 405-c-2 and the second transmitter 415-c-2 may operate according to a second, different RAT, e.g., LTE. Thus, the apparatus 115-f may be an example of a wireless communication device including first and second radios for different RATs.

In some implementations, the communications manager 410-c may perform similar operations as the communications manager 410, 410-a, 410-b described above with reference to FIGS. 4A, 4B and/or 4C. Details of such operations are not repeated here for the sake of brevity. Although not shown, it should be understood that the apparatus 115-f may include additional components, such as those described above with respect to FIGS. 4B and/or 4C, each with similar functionality.

The techniques described herein for tuning an LO may be applied to either the LO (not shown) of the first receiver 405-c-1 or the LO (not shown) of the second receiver 405-c-2, or both. In some cases, the techniques may be applied depending on which signal is dominant (e.g., stronger) and/or which signal has other options for achieving coexistence (e.g., handover to a different frequency).

Figure 5:
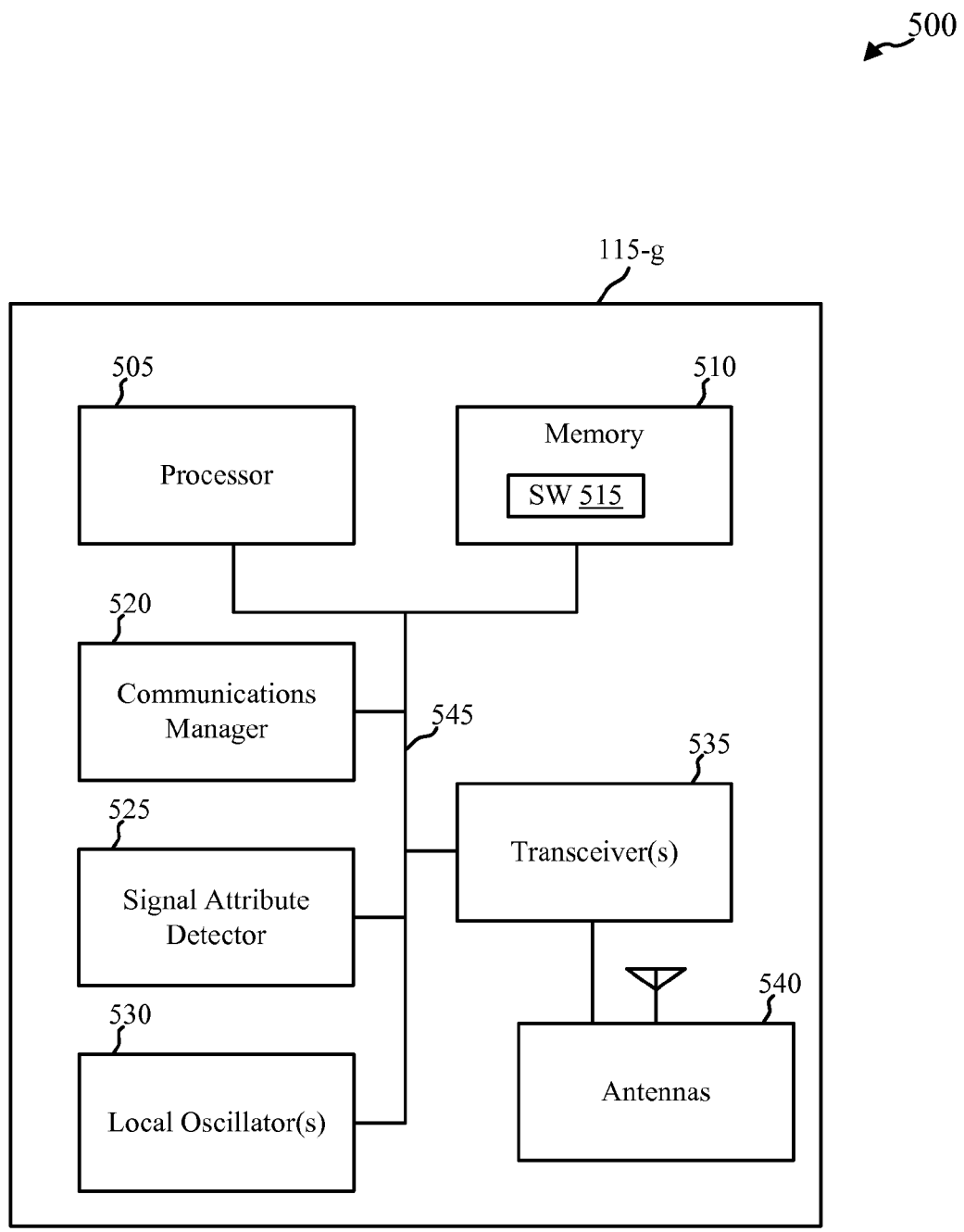
FIG. 5 shows a block diagram illustrating an example of an architecture for a user equipment (UE) for wireless communications, in accordance with various aspects of the present disclosure.

FIG. 5 shows a block diagram 500 illustrating an example of an architecture for a UE 115-g for wireless communications, in accordance with various aspects of the present disclosure. The UE 115-g may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The UE 115-g may in some cases have an internal power supply (not shown), such as a small battery, to facilitate mobile operation. In some embodiments, the UE 115-g may be an example of various aspects of the apparatus 115-c, 115-d, 115-e and/or 115-f described with reference to FIGS. 4A, 4B, 4C and/or 4D, and/or the UEs 115, 115-a and/or 115-b described with reference to FIG. 1. The UE 115-g may implement at least some of the features and functions described with reference to FIGS. 1, 2A, 2B, 3A and/or 3B. The UE 115-g may communicate with a base station 105 described with reference to FIG. 1.

The UE 115-g may include a processor 505, a memory 510, a communications manager 520, a signal attribute detector 525, at least one local oscillator (LO) 530, at least one transceiver 535, and/or at least one antenna 540. Each of these components may be in communication with each other, directly or indirectly, over a bus 545.

The memory 510 may include random access memory (RAM) and/or read-only memory (ROM). The memory 510 may store computer-readable, computer-executable software (SW) code 515 containing instructions, when executed, cause the processor 505 to perform various functions described herein for communicating via at least one RAT. Alternatively, the software code 515 may not be directly executable by the processor 505 but may cause the UE 115-g (e.g., when compiled and executed) to perform various functions described herein.

The processor 505 may include an intelligent hardware device, e.g., a CPU, a microcontroller, an ASIC, etc. The processor 505 may process information received through the transceiver(s) 535 and/or information to be sent to the transceiver(s) 535 for transmission through the antenna(s) 540. The processor 505 may handle, alone or in connection with the communications manager 520, signal attribute detector 525, and/or the LO(s) 530, various aspects of communicating over the RAT(s).

The transceiver(s) 535 may include a modem to modulate packets and provide the modulated packets to the antenna(s) 540 for transmission, and to demodulate packets received from the antenna(s) 540. The transceiver(s) 535 may in some cases be implemented as transmitters and separate receivers. The transceiver(s) 535 may support communications according to the RATs. The transceiver(s) 535 may communicate bi-directionally, via the antenna(s) 540, with the base station(s) 105 described with reference to FIG. 1. While the UE 115-g may include a single antenna 540, there may be implementations in which the UE 115-g may include multiple antennas 540.

The communications manager 520 may perform and/or control some or all of the features and/or functions described with reference to FIGS. 1, 2A, 2B, 3A, 3B, 4A, 4B, 4C and/or 4D related to wireless communication with LO tuning. For example, communications manager 520 may implement LO tuning scheme for taking into account an effect(s) on an attribute(s) of a desired signal caused by the LO tuning. The communications manager 520 may be an example of various aspects of the communications manager 410, 410-a, 410-b and/or 410-c described with reference to FIGS. 4A, 4B, 4C and/or 4D. The communications manager 520, or portions of it, may include a processor, and/or some or all of the functionality of the communications manager 520 may be performed by the processor 505 and/or in connection with the processor 505.

Figure 6:
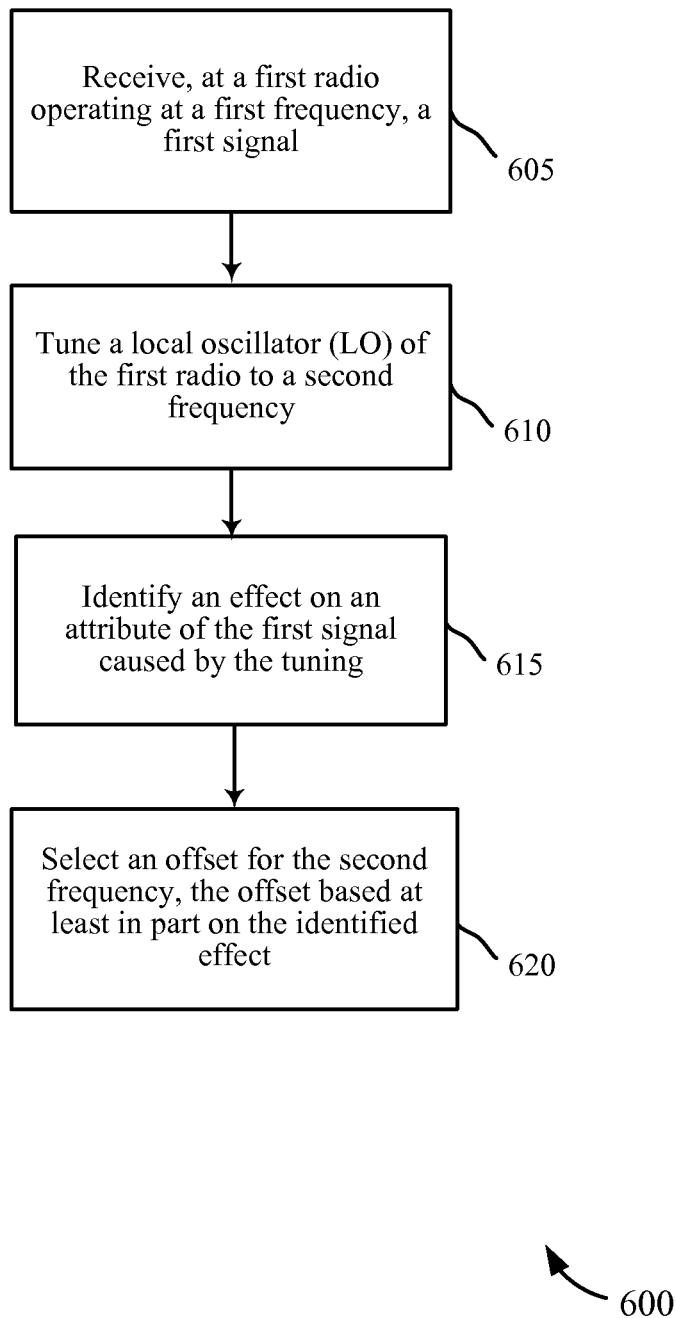
FIG. 6 is a flowchart illustrating an example of a method for wireless communication, in accordance with various aspects of the present disclosure.

FIG. 6 is a flowchart illustrating an example of a method 600 for wireless communication, in accordance with various aspects of the present disclosure. The method 600 described below may be performed in accordance with aspects of the UEs 115 described with reference to FIG. 1, and/or the apparatus 115-c, 115-d, 115-e, 115-f and/or 115-g described with reference to FIGS. 4A, 4B, 4C, 4D and/or 5. In some implementations, such a UE or apparatus may execute sets of codes to control the functional elements of the UE or apparatus to perform the functions described below.

At block 605, a first signal may be received, at a first radio operating at a first frequency. As described herein, the first signal may be according to a first RAT. At block 610, the device may tune a local oscillator (LO) of the first radio to a second frequency. An effect on an attribute of the first signal caused by the LO tuning may be identified at block 615. Then, at block 620, an offset for the second frequency may be selected based on the identified effect. In such a manner, the effect(s) on a desired signal caused by tuning the LO may be taken into account to determine the offset for LO tuning.

Figure 7:
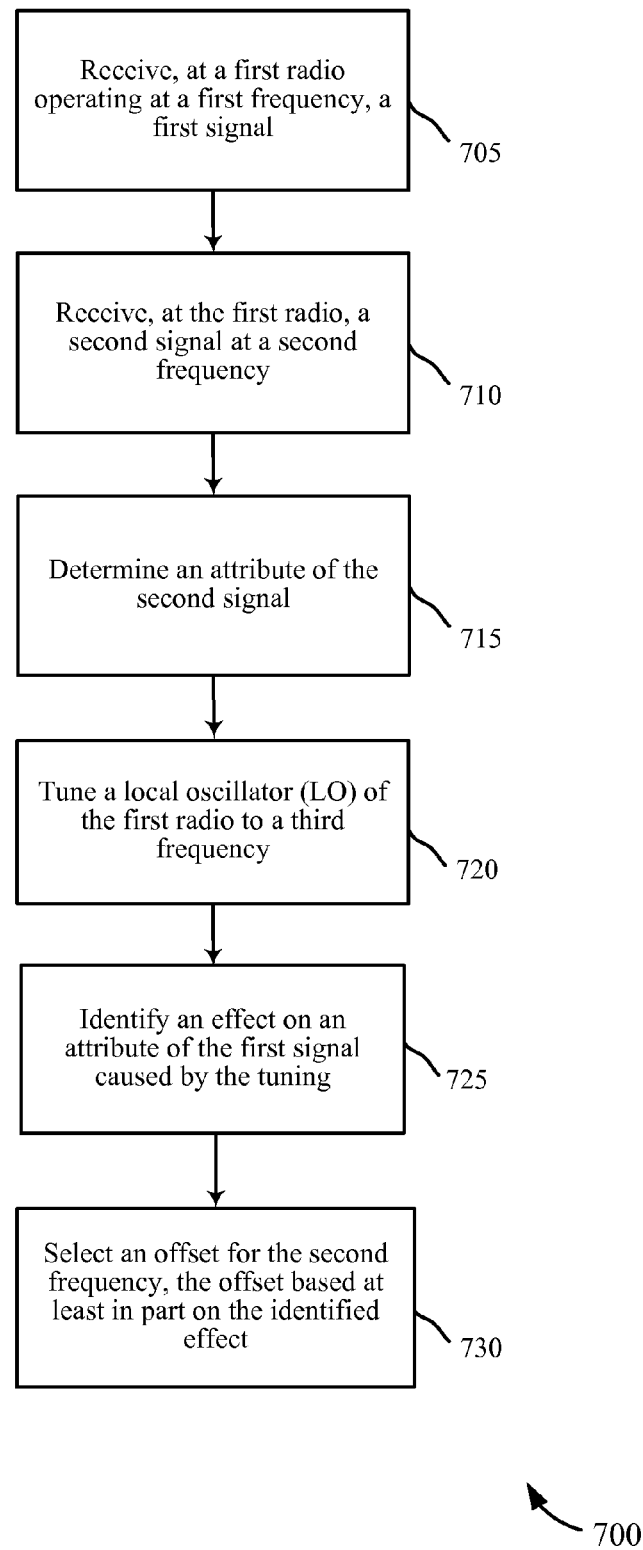
FIG. 7 is a flowchart illustrating another example of a method for wireless communication, in accordance with various aspects of the present disclosure.

FIG. 7 is a flowchart illustrating another example of a method 700 for wireless communication, in accordance with various aspects of the present disclosure. As with the method 600 described above, the method 700 may be performed in accordance with aspects of the UEs or apparatus 115 described herein.

At block 705, a first signal may be received, at a first radio operating at a first frequency. As described herein, the first signal may be according to a first RAT. At block 710, a second signal at a second frequency may be received at the first radio. As described herein, the first signal may be according to a second RAT.

At block 715, an attribute of the second signal may be determined. The attribute of the second signal may be determined such that tuning of a local oscillator (LO) of the first radio is desirable. Then, at block 720, the LO of the first radio may be tuned to a third frequency.

At block 725, an effect on an attribute of the first signal caused by the LO tuning may be identified. Then, at block 730, an offset for the second frequency may be selected based on the identified effect. In such a manner, the effect(s) on a desired signal caused by tuning the LO may be taken into account to determine the offset for LO tuning. As noted above, the attribute of the second signal may be used to determine if LO tuning is warranted. Alternatively or additionally, the attribute of the second signal (or an effect thereon caused by LO tuning) may be used in combination with the identified effect on the attribute of the first signal.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   tuning a local oscillator (LO) of a first radio to an oscillator frequency;
   receiving, at the first radio operating at a first frequency, a first signal;
   receiving, at the first radio, a second signal from a second radio operating at a second frequency before a handover and operating at a third frequency after the handover, wherein the handover to the third frequency is based at least in part on a spacing in frequency between a harmonic of the oscillator frequency and the third frequency;
   determining a change in a first attribute of the received first signal based at least in part on tuning to the oscillator frequency and the received second signal;
   determining a change in a second attribute of the received second signal based at least in part on tuning to the oscillator frequency and the received first signal, wherein the determined first attribute and the second attribute comprise at least one of a signal strength, or a received signal strength indicator (RSSI), or a signal-to-noise ratio (SNR), or a signal-to-interference-plus-noise (SINR) ratio, or a combination thereof;
   selecting an offset value for the oscillator frequency from the first frequency based at least in part on the determined change in the first attribute, the determined change in the second attribute, and the third frequency; and
   tuning the LO of the first radio to the selected offset value.

2. The method of claim 1, further comprising:
   selecting the offset value based at least in part on interference caused by the received second signal.

3. The method of claim 1, further comprising:
   selecting the offset value based at least in part on a transmission power of the received second signal.

4. The method of claim 1, further comprising:
   down converting the received first signal and the received second signal to baseband; and
   selecting the offset value such that there is no overlap between a base bandwidth of the received first signal and a base bandwidth of the received second signal.

5. The method of claim 1, further comprising:
   down converting the received first signal and the received second signal to baseband; and
   selecting the offset value such that there is a partial overlap between a base bandwidth of the received first signal and a base bandwidth of the received second signal.

6. The method of claim 1, wherein the first radio and the second radio are included in a single wireless communication device.

7. The method of claim 1, further comprising:
   receiving the first signal according to a first radio access technology (RAT); and
   receiving the second signal according to a second RAT.

8. The method of claim 6, further comprising:
   resetting the offset value after the handover.

9. The method of claim 7, wherein:
   the first RAT is wireless local area network (WLAN) based; and
   the second RAT is cellular wide area network (WAN) based.

10. The method of claim 8, further comprising:
    selecting the offset value to include a zero offset with respect to the oscillator frequency.

11. An apparatus for wireless communication, comprising:
    a first radio configured to operate at a first frequency, the first radio comprising a local oscillator (LO) tuned to an oscillator frequency;

a receiver of the first radio configured to receive a first signal and configured to receive a second signal from a second radio operating at a second frequency before a handover and operating at a third frequency after the handover, wherein the handover to the third frequency is based at least in part on a spacing in frequency between a harmonic of the oscillator frequency and the third frequency;

a communications manager configured to determine a change in a first attribute of the received first signal and a change in a second attribute of the received second signal based at least in part on tuning to the oscillator frequency and the received first signal, wherein the determined first attribute and the second attribute comprise at least one of a signal strength, or a received signal strength indicator (RSSI), or a signal-to-noise ratio (SNR), or a signal-to-interference-plus-noise (SINR) ratio, or a combination thereof; and an oscillator controller configured to tune the LO to an offset value for the oscillator frequency from the first frequency, the offset value selected based at least in part on the change in the determined first attribute, the change in the determined second attribute, and the third frequency.

12. The apparatus of claim 11, wherein the oscillator controller is configured to select the offset value.

13. The apparatus of claim 12, wherein the oscillator controller selects the offset value based at least in part on interference caused by the second signal.

14. The apparatus of claim 12, wherein the oscillator controller is configured to select the offset value based at least in part on a transmission power of the second signal.

15. The apparatus of claim 12, wherein:
the LO is configured to downconvert the first signal and the second signal to baseband; and
the oscillator controller is configured to select the offset value such that there is no overlap between a base bandwidth of the first signal and a base bandwidth of the second signal.

16. The apparatus of claim 12, wherein:
the LO is configured to downconvert the first signal and the second signal to baseband; and
the oscillator controller is configured to select the value such that there is a partial overlap between a base bandwidth of the first signal and a base bandwidth of the second signal.

17. An apparatus for wireless communication, comprising:
means for tuning a local oscillator (LO) of a first radio to an oscillator frequency;
means for receiving, at the first radio operating at a first frequency, a first signal;
means for receiving, at the first radio, a second signal from a second radio operating at a second frequency before a handover and operating at a third frequency after the handover, wherein the handover to the third frequency is based at least in part on a spacing in frequency between a harmonic of the oscillator frequency and the third frequency;
means for determining a change in a first attribute of the received first signal based at least in part on tuning to the oscillator frequency and the received second signal;
means for determining a change in a second attribute of the received second signal based at least in part on tuning to the oscillator frequency and the received first signal, wherein the determined first attribute and the second attribute comprise at least one of a signal strength, or a received signal strength indicator (RSSI), or a signal-to-noise ratio (SNR), or a signal-to-interference-plus-noise (SINR) ratio, or a combination thereof;
means for selecting an offset value for the oscillator frequency from the first frequency based at least in part on the determined change in the first attribute, the determined change in the second attribute, and the third frequency; and
means for tuning the LO of the first radio to the selected offset value.

18. The apparatus of claim 17, wherein:
the means for selecting selects the offset value based at least in part on interference caused by the received second signal.

19. A non-transitory computer-readable medium storing computer-executable code for wireless communications, the code executable by a processor to:
tune a local oscillator (LO) of a first radio to an oscillator frequency;
receive, at the first radio operating at a first frequency, a first signal;
receive, at the first radio, a second signal from a second radio initially operating at a second frequency and subsequently operating at a third frequency after a handover, wherein the handover to the third frequency is based at least in part on a spacing in frequency between a harmonic of the oscillator frequency and the third frequency;
determine a change in a first attribute of the received first signal based at least in part on tuning to the oscillator frequency and the received second signal;
determine a change in a second attribute of the received second signal based at least in part on tuning to the oscillator frequency and the received first signal, wherein the determined first attribute and the second attribute comprise at least one of a signal strength, or a received signal strength indicator (RSSI), or a signal-to-noise ratio (SNR), or a signal-to-interference-plus-noise (SINR) ratio, or a combination thereof;
select an offset value for the oscillator frequency from the first frequency based at least in part on the determined change in the first attribute, the determined change in the second attribute, and the third frequency; and
tune the LO to the offset value.

* * * * *